United States Patent
Vardi et al.

(10) Patent No.: US 8,126,476 B2
(45) Date of Patent: Feb. 28, 2012

(54) SYSTEM AND METHOD FOR MAPPING WIRELESS ACCESS POINTS

(75) Inventors: Yosef Vardi, Tel-Aviv (IL); Shimon Scherzer, Los Gatos, CA (US); Tamir Scherzer, Herzelia (IL); Avital Margalit, Herzelia (IL); Ronnie Blaier, Herzelia (IL); Yariv Lifchuk, Rishon Le Zion (IL)

(73) Assignee: WeFi, Inc., Fairfax, VA (US)

( * ) Notice: Subject to any disclaimer, the term of this patent is extended or adjusted under 35 U.S.C. 154(b) by 320 days.

(21) Appl. No.: 12/180,159

(22) Filed: Jul. 25, 2008

(65) Prior Publication Data

US 2009/0042557 A1 Feb. 12, 2009

Related U.S. Application Data

(63) Continuation of application No. 11/743,853, filed on May 3, 2007, now Pat. No. 8,000,276.

(51) Int. Cl.
*H04W 24/00* (2009.01)

(52) U.S. Cl. ........... 455/456.1; 455/456.3; 455/422.1

(58) Field of Classification Search .......... 370/310, 370/315, 318, 328, 329, 331; 455/456.1, 455/456.2, 456.3, 456.5, 456.6, 434, 432.3
See application file for complete search history.

(56) References Cited

U.S. PATENT DOCUMENTS 7,054,627 B1 5/2006 Hillman (Continued)

OTHER PUBLICATIONS

European International Search Report for PCT/US2008/009011 dated Jan. 16, 2009.

*Primary Examiner* — Jean Gelin
(74) *Attorney, Agent, or Firm* — Nixon Peabody LLP; David F. Crosby

(57) ABSTRACT

An improved connectivity to radio access point is enabled by a server that includes a database storing data about various radio access points, and an evaluation module evaluating the quality of connection to each of the access points. Clients receive updates about relevant access points from the server and use the information to connect to the preferred access point. The clients also check connectivity to other access points in the vicinity, and report the findings to the server. The server uses the reports to update its database, and send corresponding updates to the clients. The database can include information about the location of the access points. The information about the location of the access points can be manually input or determined using GPS information. The location of an access points can be determined as a function of available information about other access points detected at the same location. An access point can be presumed to be located in approximately the same location as another access point detected in the same location by the same user terminal. Where more than one access point having a known location is detected in the same location as an unmapped access point (having an unknown location), the location of the unmapped access point can be determined as function of a weighted average of the known locations of the other access points and signal strength of the signal received from each access point.

11 Claims, 5 Drawing Sheets

U.S. PATENT DOCUMENTS

| | | |
|---|---|---|
| 7,103,661 B2 | 9/2006 | Klein |
| 7,236,798 B2 | 6/2007 | Beuck |
| 7,266,595 B1 | 9/2007 | Black et al. |
| 7,323,991 B1* | 1/2008 | Eckert et al. ............... 340/572.1 |
| 7,483,984 B1 | 1/2009 | Jonker et al. |
| 7,613,427 B2* | 11/2009 | Blight et al. ................. 455/41.2 |
| 2004/0066759 A1 | 4/2004 | Molteni et al. |
| 2005/0070279 A1 | 3/2005 | Ginzburg et al. |
| 2005/0232189 A1 | 10/2005 | Loushine |
| 2006/0095348 A1* | 5/2006 | Jones et al. ..................... 705/29 |
| 2006/0095349 A1* | 5/2006 | Morgan et al. .................. 705/29 |
| 2006/0168438 A1 | 7/2006 | Klein |
| 2006/0193299 A1* | 8/2006 | Winget et al. ................ 370/338 |
| 2006/0217131 A1* | 9/2006 | Alizadeh-Shabdiz et al. .......................... 455/456.1 |
| 2006/0252408 A1* | 11/2006 | Faccin et al. ............... 455/404.2 |
| 2007/0004427 A1* | 1/2007 | Morgan et al. ............. 455/456.1 |
| 2007/0004428 A1* | 1/2007 | Morgan et al. ............. 455/456.1 |
| 2007/0010248 A1* | 1/2007 | Dravida et al. ............ 455/435.1 |
| 2007/0066304 A1 | 3/2007 | Lee |
| 2007/0079376 A1* | 4/2007 | Robert et al. .................... 726/23 |
| 2007/0112948 A1* | 5/2007 | Uhlik ............................ 709/223 |
| 2007/0121560 A1* | 5/2007 | Edge ............................ 370/338 |
| 2007/0149243 A1* | 6/2007 | Hwang et al. ................ 455/551 |
| 2007/0184845 A1* | 8/2007 | Troncoso ................... 455/456.1 |
| 2008/0013487 A1 | 1/2008 | Molteni et al. |
| 2008/0057924 A1* | 3/2008 | Stewart ...................... 455/414.3 |
| 2008/0242298 A1* | 10/2008 | Nylander et al. ........... 455/435.2 |
| 2011/0035420 A1 | 2/2011 | Alizadeh-Shabdiz et al. ............................ 707/812 |
| 2011/0143756 A1 | 6/2011 | Gallagher et al. ......... 455/435.1 |

* cited by examiner

SYSTEM AND METHOD FOR MAPPING WIRELESS ACCESS POINTS

RELATED APPLICATIONS

This Application claims priority and any and all benefits as provided by law of U.S. Application Ser. No. 60/952,027, filed Jul. 26, 2007, the entire disclosure of which is herein incorporated by reference.

This application is a continuation-in-part of U.S. application Ser. No. 11/743,853, filed Feb. 5, 2007, the entire disclosure of which is incorporated herein by reference. U.S. application Ser. No. 11/743,853 claims the benefit of priority to U.S. Application Ser. No. 60/888,291 filed 5 Feb. 2007.

BACKGROUND

1. Field of the Invention

The invention relates to accessing wireless services and locating and mapping wireless access points that provide access to wireless services.

2. Related Art

Various broadband wireless services are commonly used by users of computers, PDA's, phones, etc. Broadband wireless services are commonplace in homes, offices, and other public establishments, such as restaurants, airports, etc. Emerging new applications (portable games, PDAs, WiFi and dual mode phones etc.) raise the need for broadband wireless connectivity on demand and at any location. Additionally, newly developed content applications enrich the user's experience, provided that the user is able to easily access broadband network wirelessly. Examples of such content applications include:

User generated content such as pictures and video (e.g., YouTube, Yahoo etc.);

Video and audio streaming over the Internet;

Video games (e.g., Sony PSP, Nintendo DS); and,

Location awareness applications (e.g., Google Earth, Microsoft Virtual earth etc.).

At present, the availability of broadband wireless connectivity (such as WiFi, WiMAX, etc.) is on the rise thanks to various free radio connections enablers, such as:

Business guest networks, e.g., open networks provided in restaurants, coffee shops, etc.

Office guest networks, e.g., open networks provide in corporations, professional offices, etc.

Municipal networks, e.g., various geographical area networks established by companies such as Cloud, Google, Metrofi etc.

Public Facilities networks, e.g., networks established in conferences, shows, etc. and, Private home networks, e.g., unsecured AP's (access points), sharing AP's etc., which may have reception range beyond the particular home installing the network.

The common aspect of all these broadband connection opportunities is mediocre service due to, for example, asymmetry between down and uplink (the terminal may not be able to communicate with the AP although it can perfectly hear it); lack of standardization, which often results in connection failures (802.11 specifies only a fraction of the actual connection process); in many cases, the large quantity of WiFi radio resources produces "clutter" that makes finding an accessible source very difficult ("needle in haystack"); switching between networks is a very slow process due to the network parameters setup (IP address, DNS). When operating in heterogeneous environments that necessitate a high rate of AP switching this could be a big issue; connection operations may be complex and cumbersome (security management, captive portals etc.); and, poor geographical coverage due to insufficient radio resources density.

Consequently wireless broadband access using currently available tools still requires substantial amount of patience and expertise. Furthermore, outdoor (i.e., not home or office) operation can become very unsatisfactory. Current solutions aiming to improve the broadband access experience focus mainly on two issues: addressing the "where to find a connection" challenge and automating the connection process. For example, WiFi resources (hot-spots) maps are available through various websites (JiWire, Microsoft, etc.) to enable users to locate AP's. Laptop and WiFi enabled handheld terminals vendors are integrating better WiFi clients (in addition to Windows WZC (wireless zero configuration) service) that may reduce the user intervention in attempting to connect to an AP. For example, one method caches the last used radio connections, so that the cached information can be used in future connection attempts.

SUMMARY

However, there is still a need in the art for method and system for mapping wireless radio access points and allowing users to locate and connect to the best access point at their desired location. In addition, there is a need to provide users with information about the services and the environment that is available in and around the location where the user is able to connect to a wireless access point.

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Various embodiments of the subject invention provide method and apparatus that combines radio resource map, clutter management, and connection automation. The inventive method and system require minimal, if any, user intervention and operate in a manner that is transparent to the user. Embodiments of the invention may be effectively implemented as network overlay, thereby providing efficient service over the Internet.

According to an aspect of the invention, a server includes a database storing data about various radio access points, and a system for determining, using available information, the location of one or more access points. In many situations, the exact location of the wireless radio access point is not known because it is physically located out of view, however, in accordance with the invention, when one or more users connect to that access point from different known locations, one or more inferences can be made as to the approximate location of the access point. In addition, as a practical matter, from the perspective of facilitating the best user connection to a given access point, it is acceptable to identify the location where the best connection to a given access point can be obtained. Further, it is recognized that the criteria for characterizing what is the best location for the user can vary based on user preferences. While in some cases, the location providing the strongest signal or greatest amount of connection bandwidth can be the best location, in other cases, the physical environment and the availability of services may be more desirable than signal strength and bandwidth. Thus, a user seeking a quiet environment may prefer to connect to an access point in a quiet location adjacent to a restaurant, whereas another user may seek a location in the restaurant that provides refreshments and a more social atmosphere.

According to the invention, clients receive updates about relevant access points from the server and use the information to select and connect to the preferred access point. The clients also check connectivity to other access points in the vicinity, and report the findings to the server. The server uses the reports to update its database, and sends corresponding updates to the clients.

According to aspects of the invention, a method for connecting a wireless user terminal to a network, such as the internet is disclosed. The method can include receiving a first set of data from a user terminal about radio resources (wireless access points) in reach of the user terminal and storing the information about each access point in one or more databases. Subsequently, the system is likely to receive a second set of data generated by a different user terminal about radio resources in reach and updating the database(s) if the information is different or if additional information can be inferred or deduced from what information is available. Once information about an access point is stored in the database(s), it can be sent to one or more user terminals and used by each user terminal to select a preferred radio resource for connection. The information can include access point connectivity information that can be used by the wireless user terminal to connect to the access point. In the method, for each radio source, the first and second sets of data can include:
  i. Network name;
  ii. MAC address;
  iii. Received signal strength and variance over time;
  iv. Encryption status;
  v. Internet connection available capacity;
  vi. Access protocol response times;
  vii. Gateway IP address;
  viii. DNS address;
  ix. Occupied IP addresses;
  x. Captive portal credentials;
  xi. Connection Technology;
  xii. User Terminal Location;
  xiii. Access Point Location;
  xiv. Mapping Type—how an access point location was determined.

The data base of data can comprise the above information as well as:
  i. Location
  ii. Internet accessibility
  iii. Long term behavioral statistics comprising:
  Percentage of availability
  Signal strength variance
  Available bandwidth
  iv. Name of owner;
  v. Owner profile;
  vi. Password.

In the method, selecting the preferred radio resource can include analyzing at least one of:
  encryption status;
  backhaul performance;
  knowledge of password;
  amount of bandwidth allocated by owner for visitors; and
  number of visitors connected to the radio resource.

The method may further comprise transmitting the first set of data to a server over a network or the Internet. The method may further comprise transmitting the third set of data from the service server to the user terminal. The method may further comprise sending an update to the third set of data whenever the user terminal connects to the Internet. The method may further comprise updating the third set of data upon receiving a subsequent one of the first and second sets of data.

According to other aspects of the invention, a method for enhancing connectivity to radio access points is provided, comprising: providing a plurality of clients operating on a plurality of mobile devices; receiving connectivity reports from each of said plurality of clients; constructing access database from said plurality of reports; and transmitting selected data from said database to each of said clients. The selected data for each of the clients may correspond to access points in a geographical proximity to the corresponding client. The selected data for a corresponding client may correspond to access points in a vicinity of a geographical location indicated by the corresponding client. The connectivity report may comprise cache data of an access point. The selected data may comprise cache data of an access point.

According to yet other aspects of the invention, a method for enhancing connectivity to radio access points is provided, comprising: operating a mobile device to connect to a network access point; receiving access point data from the network access point; storing the access point data so as to generate cached data; and sending the cache data to a central server. The method may further comprise receiving from the server third party cache data, wherein the third party cached data comprises access point data obtained from another mobile device. The cached data may comprise name and MAC address of the network access point.

According to further aspects of the invention, a system for enhancing connectivity to radio access points is provided, comprising: a connectivity database; an evaluation module receiving connectivity reports from a plurality of clients and storing the reports in the connectivity database, said connectivity reports comprise data relating to radio access points to which the clients attempted to connect; and a processor sending updates to each of the clients, said updates comprising selected data from the database, said selected data relates to access points in a selected geographical region. The selected geographical region may comprise a locale in which each client is present. The selected geographical region may comprise a locale indicated by each client.

According to further aspects of the invention, a method for operating a mobile device for enhancing connectivity to radio access points is provided, comprising: searching for radio signals of access points; attempting to connect to at least one of the access points; upon successful connection storing access points data to thereby generate cached data; and sending the cached data to a remote server. The method may further comprise monitoring radio transmission activity of the mobile device; when a lull in the radio transmission activity is detected, performing: breaking the connection to the access point; connecting to another access point; storing another access point data to thereby generate another cached data; and sending the another cached data to a remote server. The method may further comprise receiving third party cached date from the remote server; and storing the third party cached data in the mobile device.

According to further aspects of the invention, a method for improving wireless connectivity to the Internet by utilizing a social network is provided, comprising: instituting a plurality of user accounts having corresponding usernames, each account corresponding to one user of a plurality of users; receiving user connectivity reports from users, each connectivity report comprising at least access point name, access point location, and access point status; maintaining a list of access points, and listing usernames of all users who send a connectivity report for the respective access point; and providing a user interface comprising the listing of usernames and a map having indicators for access points name, location, and status. The access point status may comprise one of open, locked, and requiring sign in. The method may further comprise: for each username maintaining a log of the connectivity reports sent by that user.

In addition to access point status, the database can include information about the location or locations from which a connection can be made to an access point. The location information can be input from many sources, depending on the capabilities of the wireless user terminal. For example, WiFi enabled mobile telephones can include a GPS and thus provide in the wireless connection information transmitted to the server, the GPS coordinates or information obtained from the GPS in the mobile telephone.

Alternatively, in accordance with one embodiment of the invention, the user can be prompted to input his or her location, when a wireless access point is within range of the wireless user terminal and the database does not include location information for the access point or indicates that an inferior or less accurate method of determining the wireless access point location was used. In addition to the user manually inputting their location, the user can also be prompted to input other information about their location (the location where connections to one or more wireless access points can be made). For example, the user can input the nature of the environment, whether it is indoors or outdoors, heated or cooled, dark or bright, whether it is quiet or noisy, and what services are close by. The services can include restaurants, restroom facilities, exercise facilities, shopping, hotel services, transportation services (airports, train stations, etc.), medical and emergency services, computer repair services, automotive repair services.

All of this information can associated with one or more access points in the one or more databases that store information associated with the detected access points. In addition, a user can search for access points in a desired location, such as by inputting an address or just the name of a city or town. The search can be narrowed by providing an indication of any desired environmental conditions or nearby services. The results of the database search can indicate any and all the locations that meet the user's needs. In addition, each of the users can provide ratings and reviews of the environment and the services available at a given location to further enhance the user experience. The user ratings information can be stored in the database or a separate database accessible by the server or the wireless user terminal. The rating and review information can be used by the users to select their desired location to connect to an access point.

In accordance with one embodiment of the invention, access points that are not associated with a location in the database can mapped as a function of the known location of other access points that are detected by the wireless user terminal from the same location or at the same time. For example, where a wireless user terminal detects a first access point associated with a known location and a second access point not yet associated with a location, we can assume that the second access point is close to the location of the first access point. In this way the first access point serves as a point of reference for the second access point. If the second access point is detected (from the same location or at the same time) by the same or different wireless user terminals along with other access points that are able to serve as points of reference, the location of the second access point can be refined by assuming that the second access point's location is somewhere between the two or more points of reference.

For example, given the geographic locations of each of the points of reference and signal strength of the respective signals received from the access points associated with each point of reference and second access point, we can determine an approximate location of the second access point. A location to be associated with the second access point can be determined as a function of the locations of the other access points and relative signal strengths of the signals received from the access points. In one embodiment of the invention, the location of the second access point can estimated as being in the approximate center location of the other access points and a more accurate location can be determined by adjusting the location to be in the "center of gravity" location, a location that is adjusted in proportion or inverse proportion to the signal strength of the signal received from each access point.

In accordance with the invention, the location to be associated with the second access point can be determined at the wireless user terminal or by the server or a separate process that accesses the data at the server.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Figure 1:
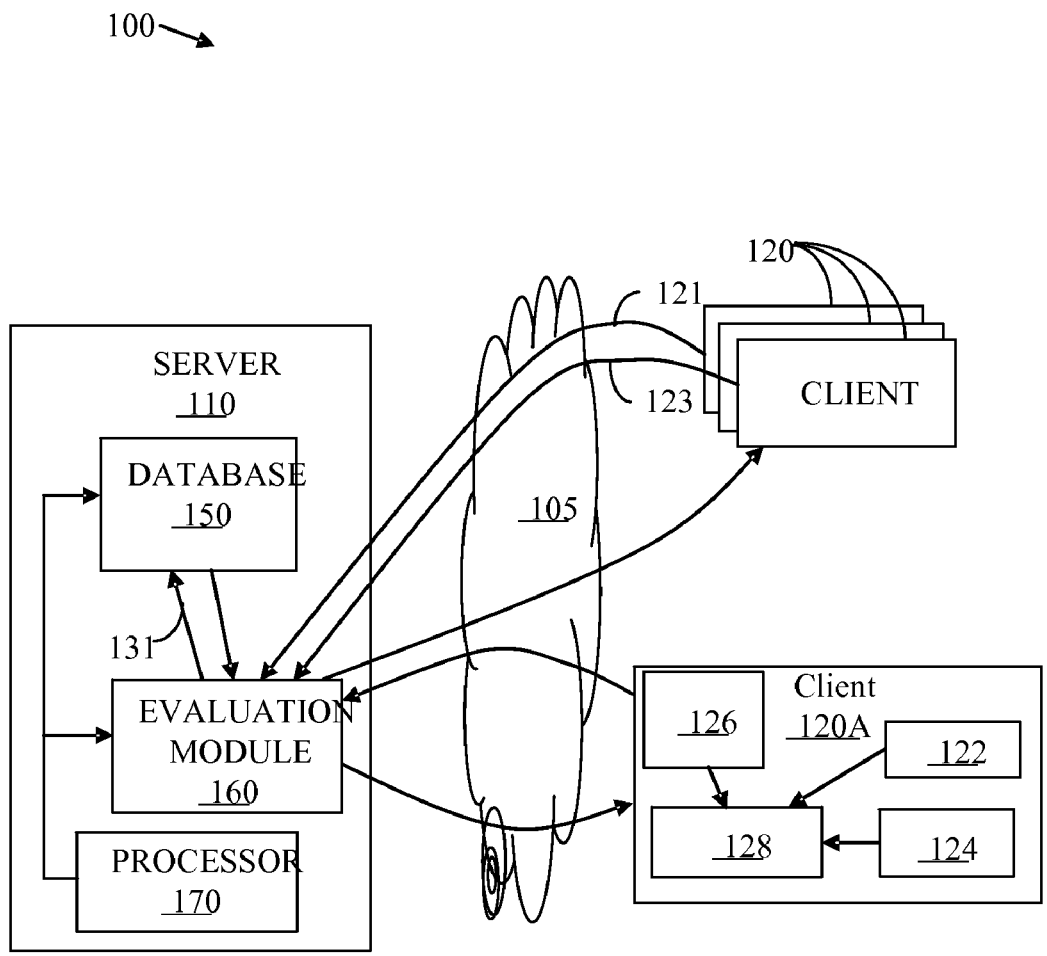
FIG. 1 is a general schematic illustrating system layout according to an embodiment of the invention.

Various embodiments of the invention provide methods and systems for enhancing broadband access and the user's experience associated therewith. The inventive method and system utilize a database (or a set of databases) or a knowledge base that contain information about existing wireless or radio access points ("APs") to provide better decisions for choosing and creating connections to APs, and utilizes users experience to update the database or knowledge base. For example, in densely populated cities users try to connect a wireless user terminal, such as a laptop or PDA to a wireless network or the internet. It is common that many radio access points are listed on the laptop's wireless network connections screen. However, as is well known that just because a radio access point is listed on the screen and shows several bars of reception strength doesn't mean that the access point is available for connection. That is, even if the access point is listed as unsecured, the laptop may still be unable to connect to that AP. To make matters worse, it is not possible to know beforehand whether the AP is available for connection or not. Consequently, at present time the only way to determine which AP is available is to try to connect to each one listed until one successfully connects. Such a reiterative process is cumbersome, especially in densely populated areas, and requires certain level of expertise in operating a laptop or other wireless mobile device. Such problems can be elegantly solved by various embodiments of the invention, as illustrated herein.

According to various embodiments of the invention, methods and systems are described that evaluate historical data discovered by the user community (such as WiFi "hot-spots" locations and quality), and real time data acquired by individual users. Each user's wireless user terminal can be a device that executes a program (e.g., a client) that uses the combined data to find usable radio resources or wireless APs and establish network connections through them, for example connections to the internet. The system can employ a client/server architecture in which each user terminal includes a client that assists the wireless user terminal in establishing a connection to the radio network. The client can be a software program executed on the wireless user terminal and the server can include a software program executed on the network server that provides the server functions described herein. In addition, client can detect the other wireless APs within range of the user terminal, gather information about the other wireless APs and report the information gathered to the network server that stores the information (or information derived from the information gathered) and subsequently shares this information with other user's clients. The information gathered can provide access point connection or connectivity data that can be used by a wireless user terminal to connect to a specific access point or used by a user or wireless user terminal to select a radio resource or wireless access point to connect to. These other user's clients can store some or all of this information in the memory of the wireless user terminal. These user's clients can use this stored information about nearby APs to determine the network parameters (before making the connection to an AP) and thus expedite the connection process. For example, establishing a WiFi connection to the Internet requires a sequence of steps, starting with the IEEE 802.11 association, continuing with security exchange, essential network IP information acquisition and accessing specific network location. If some of the connection related information is already available at the association stage, part of the other steps can be eliminated and consequently faster and higher quality Internet access can be achieved. Additionally, the ability to establish faster and more reliable AP connections can enable seamless connection switching and roaming between different radio resources or APs.

FIG. 1 is a general schematic illustrating a system layout according to an embodiment of the invention. In FIG. 1, various clients 120 and 120A can communicate with server 110 via network 105, such as the Internet. Client 120A can be any of clients 120, and is provided to show in greater detail the various elements or components that can be included in the clients 120. Server 110 can include one or more databases 150, which can store current and historical data about APs and other radio broadband access resources. Server 110 can also include an evaluation module 160, which can evaluates accessibility, bandwidth and other characteristics of various AP's, and store the information as an update in database 150, as shown by arrow 131. A processor 170 can be used to control the operations of the Server 110, database 150 and evaluation module 160, and communication with the clients 120.

Information in the form of connectivity reports can be received by the server 110 from each of the clients 120, as shown by arrows 121, 123. The connectivity reports can include access point connection data collected when each client attempts to connect to an access point. Certain elements of clients 120 are depicted in exemplary client 120A. As shown in FIG. 1, according to this embodiment of the invention, client 120A can include a credentials module 122, a local database 124, fast varying data module 126, and connection decision module 128. The functionality of these elements will be described below with respect to a method implemented according to an embodiment of the invention.

Figure 2:
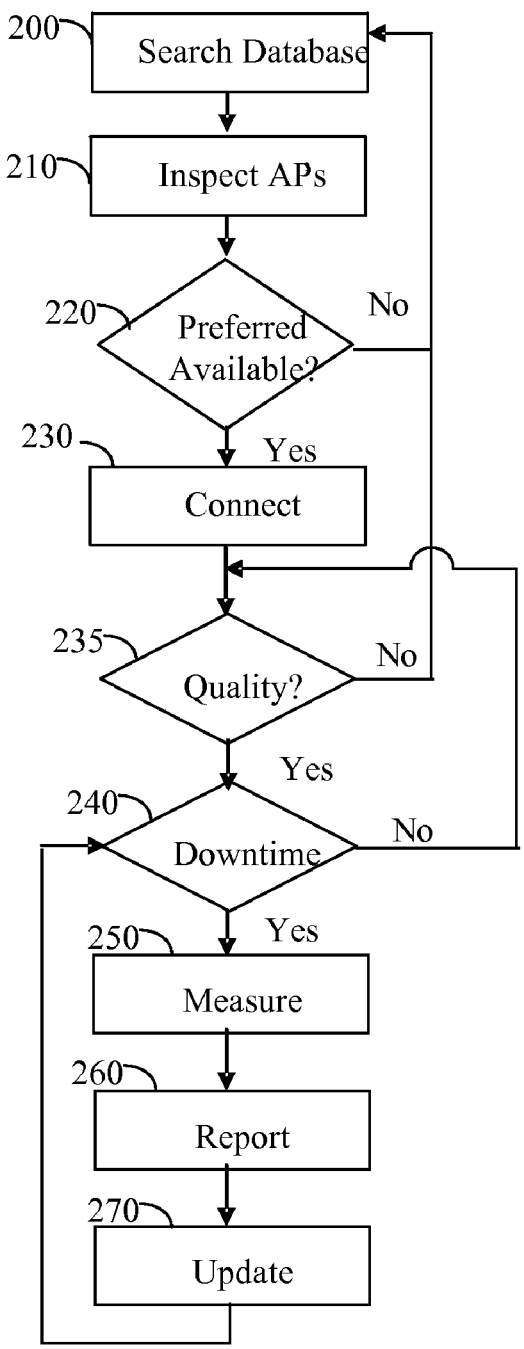
FIG. 2 is a flow chart illustrating a method to be executed by a client, according to an embodiment of the invention.

FIG. 2 is a flow chart illustrating a method that can be executed by a client, according to an embodiment of the invention. While the steps illustrated in FIG. 2 and described herein are in certain order, it should be appreciated that the various steps may be performed in a different order. In order to connect to a broadband network, at 200 the client 120A can query or search its local database 124 to obtain the best available AP for the particular location. At 210, the client 120A can inspects all available radio signals in the area. Then, at 220 the client 120A can check whether the preferred AP for that location is available. If not, the next best AP is selected and again it is checked whether that one is available, and so on, until at Step 230 the client connects to an AP. Alternatively, the client 120A can detect all available APs and then search its local database for a best or preferred available AP.

While the client 120A user terminal is connected to an AP, at 235 the device can check the quality of the connection. If the connection quality is below a set quality threshold, the system can revert to 200 to select another AP for service. According to embodiments of the invention, the quality of a connection can also take into account bandwidth loading on the AP. For example, in situations where many APs are available and many users are present, it often happens that most users use one specific AP, e.g., the first listed AP. Consequently, one AP may experience high load, while others low load. Therefore, it may be the case that one AP may have lower radio reception strength, but be very lightly loaded so that it would be preferable to choose such an AP over one with high reception strength but is heavily loaded. The client, according to the embodiment of the invention, therefore can check the AP loading in addition to other quality related, connection parameters. If the connection quality is acceptable, at 240 the client checks whether the wireless user terminal is in downtime, i.e., there is a lull in communication between the device and the network. If so, at 250, the client can detect and measure the connection parameters of other available AP's and at 260, the client can report the measurements and other information to the server 110. At 270, the client can receive an update from server 110, which can include access point information and updated data to update its local database 124. The updated data can include information gathered by other clients that was sent to the server 110, and used to update the database 150.

The server 110 can continuously receive the connection parameters and measurements from various clients that are connected to access points. The server 110 can use the connection parameters and measurements from the clients to update the database 150. In this manner, the database 150 is enhanced and continuously updated to include up to date data on any AP, including existing APs and APs that were newly put to service, modified, or removed from service. This updated information can be sent to the clients to update each client's database. However, in order to conserve resources, according to one embodiment of the invention, only data relating to APs in the client's general neighborhood (APs detected by the wireless user terminal) is sent. According to another embodiment the user can indicate for which geographical area the user wishes to obtain updates. In this manner, for example, if the user intends to take a trip to a different location, the client can request an update of available AP's at the destination location beforehand. Similarly, if the user continuously commutes between two or more locations, the user can request constant updates for these indicated locations.

According to one embodiment of the invention, the clients can exploit gaps in data communication with the connected AP to detect and make radio measurements and gather other information about other radio resources (ex. WiFi access points) in their neighborhood (i.e., resources "in reach") to evaluate their ability to provide broadband network access.

According to one embodiment of the invention, this evaluation or exploration can go beyond the normal RSSI (received signal strength) and security evaluation done by typical WiFi clients. Specific example of such evaluation will be provided further below. The client can transfer the information gathered from these measurements in reports that are transferred to network server, so that the historical information in radio resources or AP database is expanded and updated at the network server over time.

The reports that include the new or updated measurement data are sent by the clients and received by the server. The reports and historical radio resources data can be used by the evaluation module 160 to determine quality and accessibility attributes of the radio resources which can be subsequently updated in the database 150. This determined attribute data can be selectively transferred to individual clients. The clients can use this data to update their local radio resources database 124, and to enable the client or the user to select the best radio resource available and quickly establish a connection. The connection process can be expedited by reducing the number of connection steps. As the number of user connections and quality increases, more reports are generated, thereby leading to further improvement in radio connections. As a result of this process, clients are able to:

a) Establish control signaling with network servers;

b) Allow individual clients to select the best radio connection;

c) Facilitate quick and reliable connection through predetermined connection parameters;

d) Provide an updated radio resources geographical map with connection likelihood. This map could be displayed on a laptop, PDA, cell-phone, etc., upon request; and, e) If current connection quality falls below minimum level, automatically switch the connection to a better radio resource. In most cases, connection can be established without any user intervention: once a user initiates a network-based application (e.g., access to websites, playing games through the web, using IM, sharing files, making IP call, etc.), the system can execute an automatic Internet connection (Autoconnect). The automatic connection can be implemented by continuously or periodically executing the loop to periodically check the quality of the connection at 235 of FIG. 2. The user may also access the connection facility manually through an application control window.

According to embodiments of the invention, clients continuously collect radio resources information about APs detected by the wireless user terminal. These clients can be executed on laptops, handheld devices (PDA's), cellphones, or any other devices that incorporates a radio facility for wireless communication, such as WiFi. For example, a laptop based client can conduct a radio survey while the laptop is on. Handheld devices can execute this function either while activated for Internet use or while idle (i.e., in the user's pocket). Each active user terminal should be able to conduct a radio resources survey whenever it is in use. This can be achieved by "measurement trips" wherein the client is directed to associate with an AP other than the one used for current network connection, and conduct data acquisition as described herein. These "measurement trips" can be executed while no time-sensitive traffic transmission is performed, so as to avoid degradation of the user's experience.

Notably, the actual number and frequency of measurement trips per user needed decreases as the user population grows. For example, if only one user is present at a given geographical area, but several radio resources are available, a relatively large number of measurement trips would be required to provide sufficient data to properly characterize all of the available radio resources. On the other hand, if one hundred users are present in that geographical location, it may be sufficient for each client to perform only a single trip, which from the server perspective would amount to one hundred trips.

According to an embodiment of the invention, the following parameters can be collected and reported by clients as a result of a "measurement trip":

Backhaul quality (estimated bandwidth connection to Internet);

Gateway and DNS IP addresses;

Captive portal status (i.e., does AP have captive portal?);

AP security status (e.g., free, WEP, WPA, WPAII); and

Estimated location (i.e., when the client determined its own location).

The above information can be tagged or associate with information acquired as part of the standard 802.11 scan, i.e.:

Network or AP name (SSID—service set identifier); and,

AP Radio MAC address.

According to embodiments of the invention, in order to acquire the radio resource measurements and parameters, each trip can include either complete or partial wireless Internet connection. The measurement and connection processes can incorporate up to six phases, or any combination thereof:

F1—Basic IEEE 802.11 association procedure (inclusive of WEP, if needed); either using beacon information or probing to get association information. Being short duration, this operation can be repeated frequently. The rate of successful associations can provide a good indication of signal quality and radio interference.

F1.5—Once F1 is successful, a static IP address is selected for higher layers (OS, applications) as described in commonly owned U.S. patent application Ser. No. 11/636,414, filed on Dec. 8, 2006, and entitled "Masking Changes for Seamless Roaming in Heterogeneous Networking," which is incorporated herein by reference in its entirety. In response to this assignment of a static IP address, the wireless terminal generates an ARP (address resolution protocol) request and waits until the ARP response. This phase may take a hundred of milliseconds.

F2—IEEE 802.11 authentications; (WPA, WPA2 . . . ). Authentication is normally time consuming and with high duration variability. This phase may last few seconds (depend on AP firmware implementation).

F3—DHCP (Dynamic Host Configuration Protocol)-discovery operation to provide the network gateway (GW) IP address, subnet mask values and optional DNS address. The GW IP address is essential for the generation of an appropriate static IP address to allow Internet access (IP address value must be selected within the space defined by the GW IP address and its associated mask). The DNS address value may be essential but could be obtained by other means.

F4—Obtain static IP address value. This IP address value is exposed to the network, but not to the higher layers above. This IP address value can be verified by generating an ARP request (with the selected IP address) on the host network. In addition, another ARP request with the gateway address can be generated to update the device's ARP table.

F4.5—This stage includes three steps:

Send ping with "time to live" (TTL) equal 3. This ping will test response of the subnet gateway and the next two network nodes behind it (upstream). If all network nodes respond to the ping, an Internet connection is verified.

HTTP request to network server is generated to discover captive portal: if a captive portal exists, the HTTP message will be "hijacked" and re-direction indication status destination is returned.

UPDP (Universal Packet Driver Protocol) frame is transmitted through ports 53 and 80 to a dedicated server to check Internet connectivity. Transmission success is evaluated after returning to the active connection and asking the server ("cache server") if the message properly arrived.

F5—Setting firewall status and allowed bandwidth consumption. Firewall can be set to one of three states:

Block everything (status=0)

Allow Internet access only (status=I); normally used by visitor firewall to prevent access to shared AP subnet resources (printer, etc.).

Allow access to Internet and subnet (status=2); normally used by AP owner allowing access to subnet resources.

The success or failure of the "F" steps and actual duration times required to accomplish each of the "F" steps can be combined to determine an "F-timing vector". This information can be used to characterize an access point's behavior and performance.

The radio resource database 150 stores data on all radio access points (WiFi and others) that have been discovered or registered by the user community. The client can access this information as necessary to:

Review potential wireless network and Internet connection resources on a geographical presentation (map, aerial photos, etc.);

Select local usable wireless connections from IEEE 802.11 scan results.

The above information can be used to build and expand the radio resource database 150. The database 150 can include a list of APs reported during previous scans, measurement trips, and user AP registration (user registering an AP can set the percentage bandwidth that can be shared). Each database entry can be indexed by SSID and MAC address or other AP identifier and can include:

Backhaul quality (estimated bandwidth connection to Internet);

Gateway and DNS IP' addresses;

Captive portal status (i.e., does the AP have captive portal)

AP security status (e.g., free, WEP, WPA, WPAII);

Location information;

Location Mapping Type, indicates the method use to map (determine the location of) the AP "F1" to "F5" success rate;

"F1" to "F5" average execution periods; and,

Percentage allowable shared bandwidth.

According to one embodiment of the invention, each report can also be time stamped. Time stamping can assist in ensuring that data sent to clients is based on current information. For example, a time period may be established after which a report received from a client is discarded. Alternatively or in addition, a weighted system may be established so that the importance of a report diminishes with time, and most recent reports from a client get the highest credence.

The process of wireless connection to a network or the Internet can be substantially shortened when user terminal "knows" some or all of the needed connection information before a connection attempt is executed. For example, when the terminal knows which of multiple APs has a good backhaul it can select the right AP for connection, thereby avoiding connection testing and "re-tries". If the terminal knows what IP address will be acceptable while connecting to a specific network, the DHCP (Dynamic Host Configuration Protocol) process of being assigned an IP address can be avoided thereby saving substantial amount of time. For each connection procedure, the client can execute all or part of the listed "F" steps".

In a standard system (for example, a Windows based system) all "F" steps must be performed since no information regarding accessed network is known beforehand (a safe assumption for distributed network with independent clients). Sharing centralized radio resource information with each client allows shortcuts, so more information is known by the clients about the selected access point and the number of "F" steps can be reduced and the connection time minimized. Typically, when the AP is already part of radio resource database, only F1 (association), F2 (WPA exchange) and F4 are needed, thereby substantially reducing the average connection time. When the number of users increases, F4 can be shorten as well (eliminate ARP function). The reduced connection time allows for seamless connection switching (and roaming) without centralized control.

For example, it is well known in prior art computing systems to cache information related to an access point to which the mobile device has connected before. In this manner, when the mobile device is activated at a later time in the same locale, the system uses the information in the cache to automatically reconnect to that AP. The cache normally includes the name and the MAC address of the AP. However, when the mobile device is activated in a new location, it has no information in the cache to enable fast connection to an AP. According to an embodiment of the invention, when clients send connection reports they also send the cache information. Then, the server sends cache information to each client, relating to all APs in the vicinity of the client or in a geographical area requested by the client. In this manner, the mobile device can have cache information of APs to which the mobile device was not connected before. Thus, for example, if a user travels to a new location, the user can indicate the travel destination to the server and the client can download cache information relating to APs at that geographical location. Then, when the user reaches that location, client on the mobile device can use the information in the cache to easily connect to APs in the destination location.

To expedite wireless network and Internet access, radio resource information that has been accumulated and processed at the network server can be distributed to user terminals (clients). According to one embodiment of the invention, the distribution can be limited to only information that is relevant to each specific client. According to one example, relevant radio resource information to be distributed can be limited based on the client's geographical location. The client's geographical location is defined as the location where the last network or Internet connection had been established; e-g., home, office, free hotspot etc. The network can determine a client's location using known methods, for example, IP location services. An IP location service can locate the client to city or neighborhood, etc., based on the IP address assigned by the internet connection. Hence relevant radio resource information may be relevant to same city or neighborhood. Although this approach may not be sufficient when the client is relocated between cities, the client's autonomous connection capability can establish a first connection in a new place and facilitate a first radio resource information distribution. Thereafter, the client can execute the processes described herein to obtain data about radio resources in that specific geographical location. Additionally, as described herein, the user can indicate a specific geographical location for AP update.

Connecting to a wireless network starts by scanning the neighborhood for candidate AP connections (IEEE 802.11 scan). The IEEE 802.11 scan can produce a list of access points in reach. For each intercepted access point, radio signal strength indication (RSSI) information is provided along with the type of security status. The connection process will exploit the radio resource information in its memory. Next, the client selects the most favorable access point for connection in the following order:

If a "favorite" AP (AP is called favorite if it is part of radio resource database that had been distributed to client, or user manually added it to the favorite list) is detected by the IEEE 802.11 scan and the RSSI is above a predetermined threshold (ex. Owner's AP), the client can select this AP for connection, or If a list of previously successfully used access points is available (locally stored) and some APs on the list are available and their RSSI is above predetermined threshold, the client can select the AP with the highest RSSI value for connection, or If an one or more APs that are registered as collaborating APs are present and their RSSI is above predetermined threshold, client will select the AP with highest RSSI, or If only free (non-secured) APs are present and their RSSI is above predetermined threshold, the client will select the highest RSSI AP first and if connection cannot be made, will select the next highest RSSI AP and so on, until connected.

If only captive portal APs are present and captive portal parameters are known and their RSSI is above predetermined threshold, select the AP with highest RSSI and connect. If after the above process no connection is achieved, client declares "no connection possible".

As mentioned above, the connection process (F1 to F5) is being shortened as much as possible depending on whether radio resource information regarding the target AP is already known.

As described above, procedure F4.5 allows identification of captive portal existence. When user tries to access a captive portal for the first time, his request for specific site (normally through browser launch) is hijacked and a captive portal page is presented. The user then must enter various information elements as prompted by the captive portal page. This session can be recorded by the client and cached for future connections to same portal. When the device tries to connect to the same portal again, the client can automatically carry the session. This action relieves the user from the need to handle the lengthy interaction with the portal when connecting. Sometimes not all information transactions can be automated (ex. CAPTCHA verification by typing distorted letters). In this case, some user interaction (entering some data) may be needed. In addition, the session details can be sent to the network server to be cached for other users in network server's captive portal database. For each captive portal name a transaction script can be stored. A localized version of this database can exist at the client as well. The client's database can contain a fraction of the network server's database and include only information about those captive portals that are in its neighborhood. When a user is connected to a network or the Internet, its local captive portal database scripts can get updated based on its speculated neighborhood. The speculated neighborhood can be determined based on the location of the current Internet connection. In addition, the user can update its captive portal database manually by defining the desired neighborhood.

The network server can use the client reports to determine AP accessibility and potential service quality. The AP Quality and accessibility (Q&A) vector can be encoded into radio resource database entries. It is useful to make this information concise in order to minimize the traffic load when updating the clients' local radio resources database. These entries can be stored at the network server database 150 and based on location coordinates, sorted into or otherwise associated with "wireless regions." Radio resources regions are geographical areas such as cities, parks, groups of cities, states and other geographical areas of interest. The radio resources are sorted or associated with these regions based on location coordinates reported by the clients. A regions' size can vary dramatically. The number of regions can change over time to reflect radio resources distribution and other factors. APs can be sorted by MAC address and/or SSID. Combining SSID and MAC address provides a more robust (unique) indexing. Each AP's Q&A vector can include:

Connection Quality;
Ease of Accessibility;
Gateway IP & mask;
Time Stamp; and,
Location coordinates.

Connection quality can be calculated based on first and second order statistics of ping delay, RSSI, achieved data rate (over all clients' reports):

Accessibility can be defined in two attributes:
Accessible/non-accessible, and,
If accessible, "ease of accessibility" is calculated based on statistics of success of F operations rate and F-timing vector value (over all clients' reports) weighted by security status and availability of password.

$$\text{Ease of Accessibility} = A^*(\text{Connection Success Rate}/\text{Mean}(\text{Connection Time}))$$

Upon first time login, the information for the selected region from radio resources database (based on client's estimated or reported location) can be downloaded into the client. This information can be downloaded in sections starting with immediate neighborhood region and gradually (as time and space permit) expanding to larger or adjacent regions. The client radio resource database can be updated when:

The AP information in server database section (region) that is relevant to current client's location has changed by more than a certain update threshold since last update. To minimize traffic it is beneficial to load only the changes since last update.

The client moved to a different radio resources database region.

The client's database is empty or has been erased.
The client has requested an update.

When client becomes active it executes an IEEE 802.11 scan for APs in reach and determines the SSID, MAC address, RSSI and security status). Using the MAC address, the client can compare this scan result with its radio resources database to determine which APs are preferred for connection and roaming.

Figure 3:
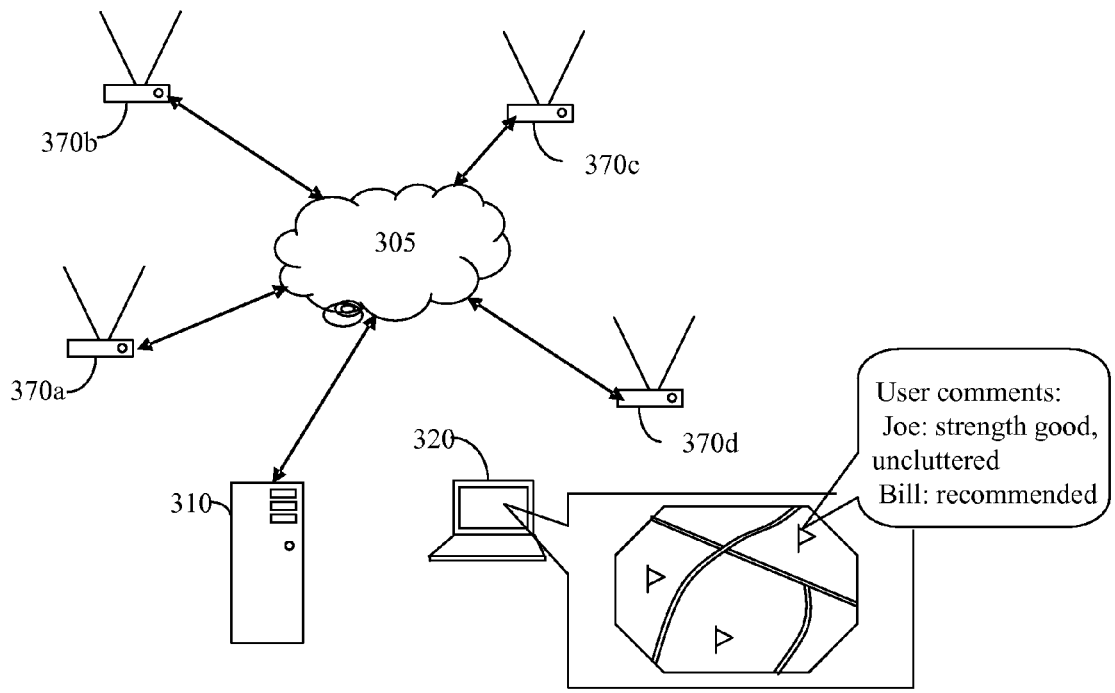
FIG. 3 is a schematic illustrating a social network according to an embodiment of the invention.

According to one aspect of the invention, the access method and system can be implemented using a social network. Generally owners of radio access points are averse to sharing the AP resource with people they don't know. However, if there has been certain a priory contact, owners are much more likely to share the resource. Such an a priory contact may be made in the form of a social network. FIG. 3 is a schematic illustrating a social network according to an embodiment of the invention. In FIG. 3, a computing resource, such as server 310, and radio access points 370*a*-*d* are connected to a network 305, such as the Internet. In this embodiment, access point 370d belongs to a user who also uses access device 320, such as a laptop, a PDA, etc. The user generally is able to access the Internet 305 by connecting device 320 to access point 370d wirelessly. As is known, access point 370d operates to a certain range, which may generally allow other users to receive the signal of access point 370d. The security of access point 370d can be set to allow no access, allow limited access, or allow all access, by the choice of the owner. When the owner registers access point 370d as member of the social network, the owner can specify the amount of bandwidth the owner is willing to allocate to third parties who are in the vicinity of the access point 370d. The owner can specify other parameters, such as access password, etc. When third parties connect to access point 370d, their client report connection data of access point 370d to the server 310. In this manner, relevant and updated information regarding access point 370d can be stored in the database of server 310.

Conversely, when the owner of device 320 is away from its own access point 370d, the client of device 320 queries its database to determine which member's access point is available and at what connection quality. The client then connects the device 320 to the preferred access point. The client then sends connection information to the server 310 to update its database. In this manner, by agreeing to provide connectivity via its own access point, the user is able to obtain access to the network when the user is away from its own access point. That is, other members in the social network will allow the user to access the Internet via their access points. Moreover, a database is built which stores relevant and updated information regarding the location and quality of all members' access points. In this way, availability of radio access point is increased and connection to access points is improved.

FIG. 3 also depicts in the callout a feature of the invention wherein a geographical map can be provided to device 320 to indicate locations having radio access point. As shown in the callout, a map of a delimited geographical area is depicted, and flags can be used to indicate where radio access points are available. While flags are used in this example, any other shapes can be used. Additionally, according to a feature of the invention, the flags can be colored in different colors according to their access quality and other attributes. For example, the colors can change from green to red, wherein green is excellent access quality while red is poor. Additionally, or instead, numerical indication can be included in the flag to indicate the quality ranking of the access point. Both color and ranking can be used.

Moreover, the ranking can reflect both the quality of the access point in general, and the ranking of the access point with respect to the specific location the user is presently situated at. That is, access quality can change depending on the location of the mobile device with respect to the access point. However, location of mobile devices can be a repeatable event. For example, many users may frequent a specific restaurant or coffee shop. Therefore, it is very likely that previous users visited the same establishment and the client on their mobile device sent a report about the connectivity to the access point from that specific location. Thus, when the server determines the location of the mobile device of the user, the server can present a ranking of the access point with respect to the specific location of the mobile device.

Receiving ranking from many users about various AP's in the vicinity of the user can be very helpful in establishing a connection when many AP's are available. As experienced by many uses, when many access points are available, users generally simply try to connect to one after the other until success is achieved. However, if it is known beforehand that one or a few specific points are available and reliable, it would be more efficient to devote the efforts to connect to those specific APs. By having the ranking on the map, which may reflect reports from various other users, a user or client is able to better select the AP to access. Furthermore, by having the map beforehand, a user or client can chose one location over another. For example, a user may prefer one coffee shop over another and indicate this by noting on the map that one coffee shop is situated for better Internet access.

In one embodiment, where the system is implemented in the form of a social network, users can send comments and other information about a specific AP or the environment where the AP is located, in addition to the client's reports. The comments and other information can be aggregated at the server, stored in the database or an associated database and processed to determine ratings or ranking for the AP or the comments and other information. In this manner, users are able to observe an AP's rating generated from various clients' reports, and may also read comments and other information provided by other users. For example, if one specific commenter is known from experience to be reliable and write informative comments, it would make selecting the proper AP more easy and efficient by following his suggestions. According to one implementation, the comments may be accessible by clicking on the flag of a particular AP of interest or by simply positioning the mouse over it ("mouse over") so as to open a secondary window, as shown by the secondary callout in FIG. 3.

The database 150 can include information that provides an indication of the location of the AP or one or more locations where a user can connect to an access point. This enables a user to search the database 150 for wireless APs at a given location. When a user terminal connects to a wireless AP, the client 120A assesses or measures the connection parameters including signal strength and reports this information to the server 110 in order to enable the server 110 to update the database 150.

In some situations, the client 120A may not have information about the location of the AP in its local database or cache 124. For example, the location for the AP may not be in the server AP database 150 because when the AP was first detected, no location information was available. Alternative, the AP may be a new AP and the client 120A is the first to connect to it. In this situation, where the location of an AP is not known, the present invention includes embodiments which enable the location to be determined.

In accordance with one embodiment of the invention, the client and the server can include Mapping Type information that indicates the method by which the AP was mapped. Because some methods of mapping can be considered more accurate than others, where the server or the client receives information about the location of an AP using two or more different methods of mapping, location information determined using one method can be selected to take precedence over location information determined using another method. Table 1 shows an example of mapping types according to one embodiment of the invention.

TABLE 1

| Mapping Types | |
|---|---|
| Enumeration Value | Mapping Type |
| 0 | Not mapped |
| 2 | From Map My Location (MML) manual process |
| 3 | Provided by partner/ACNR/Address locator Service |
| 4 | By GPS in user device |

TABLE 1-continued

Mapping Types

| Enumeration Value | Mapping Type |
|---|---|
| 5 | Auto-Mapped |
| 15 | No Information from Client |

In one embodiment of the invention, the client 120A can provide for manual mapping of an AP. When the client connects to an AP and there is no location information associated with the AP in the local database 124, the client can prompt the user to manually input location information, herein referred to as Map My Location ("MML") process. In one embodiment, the user can input a street address and this information can be used to update the local database 124 and be included in a report sent to the database 150. In one embodiment, the user can be presented with a graphical representation of map and can click on or move an icon, such as a flag to their approximate location. Based on the graphical representation and the location where the user selected, the location information can be collected. The information can be stored as the text of the street address or it can be converted to global coordinates (such as longitude and latitude). In addition, local database 124 and the AP database 150 can also include information about how the location of the AP was determined; using the MML method can be assigned the value 2.

In addition to location (and address), the user can provide additional information relating to his impressions regarding the attributes and available services near the location. For example, the additional information can include a location type (coffee shop, hotel, restaurant, doctor's office, store etc.), the working and environmental conditions (how comfortable, indoor/outdoor, temperature, shade, desks availability etc.) and availability and quality of services (food, shopping, restrooms, parking, hospitability, etc.). In accordance with one embodiment of the invention, the users can continue to input this additional information about the attributes and available services in area, after the location is mapped. This can be provided in the context of a social network where users contribute information about the wireless environment. This information can be later used by other user to help them selecting the best location to connect to a network or the Internet.

In accordance with one embodiment of the invention, mapping can be accomplished using a GPS that is included in or connected to the wireless user terminal. For example, GPS mapping can be accomplished by walking or driving through an area while the wireless user terminal detects and records its location and the AP identifiers of the APs in the area. The collected data can be stored in memory and uploaded to the server when user terminal establishes a network or Internet connection. Similarly, cellular handsets equipped with WiFi radio and GPS can be used for this method. In this embodiment, the wireless user terminal can scan for APs on a periodic basis. When a wireless AP is discovered, its location can be determined using the GPS. The collected information can be transmitted to the server via any of the wireless connections available. The location information can be sent to the server using the cellular data connection or using a wireless AP connection; any available data connection can be used. In both cases, the terminal can collect other information as described herein (RSSI, security, bandwidth, etc.). The Mapping Type associated with this method, GPS confirmed by user device, can be assigned the value 4.

In accordance with one embodiment of the invention, Cellular based location can be used instead of GPS where the cellular network deployment density is sufficiently high, such as many downtown areas. This can be accomplished using cellular transmission towers to determine location. In addition, if the AP's location is reported multiple times and/or by multiple users and/or different locations, the cellular location information can be averaged to produce a much better location accuracy.

In accordance with one embodiment of the invention, mapping can be approximated using mapping by similarity. This embodiment involves using previously mapped APs as points of reference to approximate the location of APs that are detected in the same locations. For example, while a wireless user terminal is connected to an AP, it can periodically scan and detect other APs that are within reach. Where the wireless user terminal detects an AP having a known location associated with it (a point of reference), the client can presume that any other AP detected from the same location should be associated with the same location. Where the AP is detected from two different locations, either by the same user terminal or different user terminals, RSSI information can be used to determine the approximate location of the AP.

Figure 4:
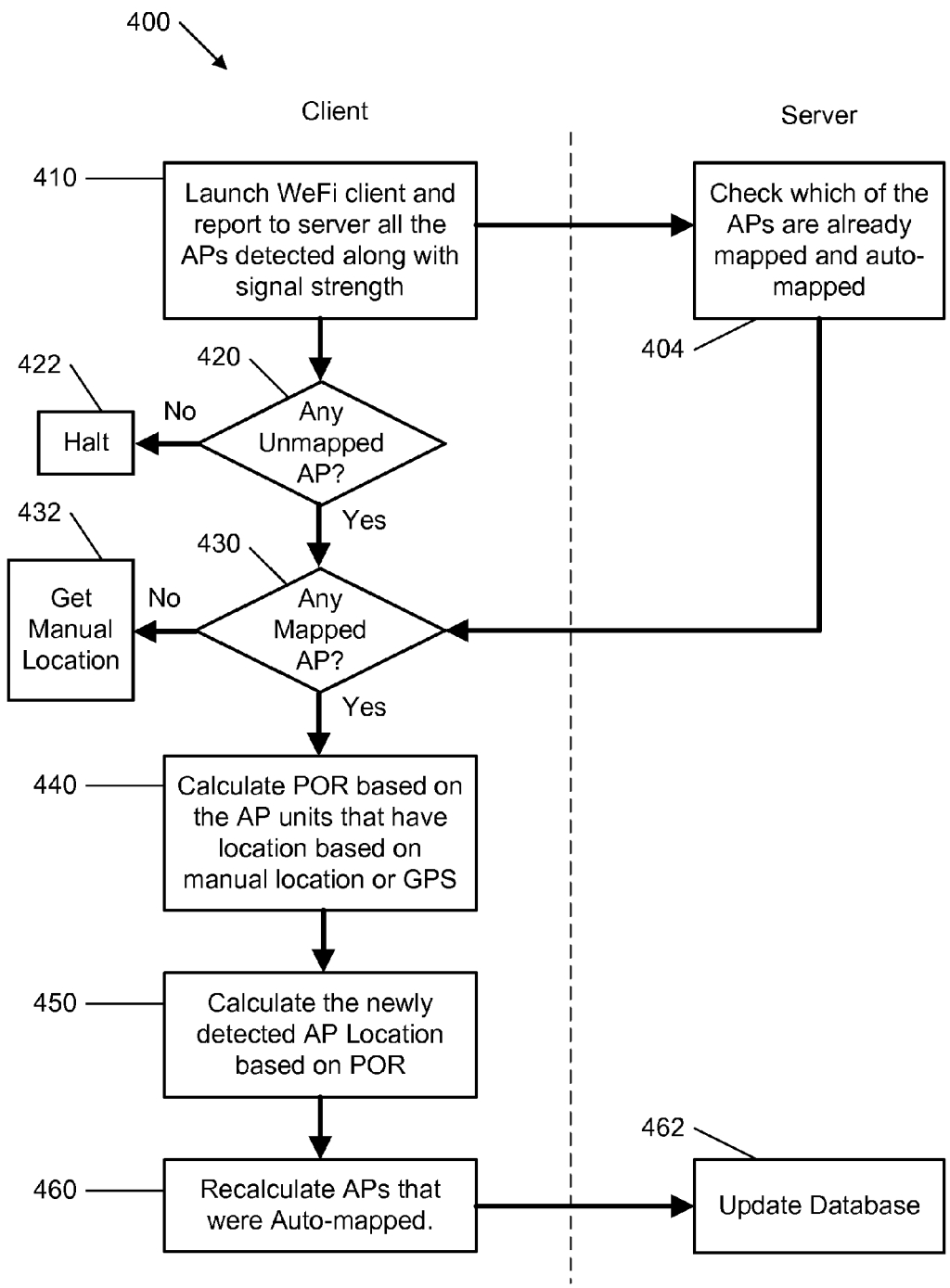
FIG. 4 is a flow chart of the process for mapping access point locations based on known points of reference according to an embodiment of the invention.

FIG. 4 shows a method 400 according to one embodiment of the present invention for determining the location of an AP. At 410, the client is executed and detects the APs in reach. The client can also report to the server the APs detected and other information including received signal strength. The client can store this information in its local database for later use. At 420, the client can search the group of APs detected to determine if any are not mapped. This can be accomplished by evaluating the Mapping Type value associated with any AP for an indication that the AP is not mapped, for example, a value=0. If not, the process can terminate 422 or pause and be restarted when a new set of APs are detected. At 430, the client searches the group of APs detected to determine if location information is available for any AP in reach. If not, at 432, the client can prompt the user to manually input their location, using for example, Map My Location as described herein. At 440, APs that have location information can be used to create points of reference to determine an approximate location of the user terminal and at 450, an approximate location of the unmapped access point can be determined. These newly mapped APs can be associated with the Mapping Type "Auto-Mapped" (Mapping Type value=5) meaning that location is an approximation based on other points of reference. At 460, where there are previously "auto-mapped" APs detected by the client, the client can calculate a new location of each of these APs using the new information. The new location for each "auto-mapped" AP can be an average or a weighted average of the old location information and the new location information for the AP. These APs can continue to be associated with the Mapping Type "Auto-Mapped" (Mapping Type value=5) because that new location is still an approximation based on other points of reference.

Figure 5:
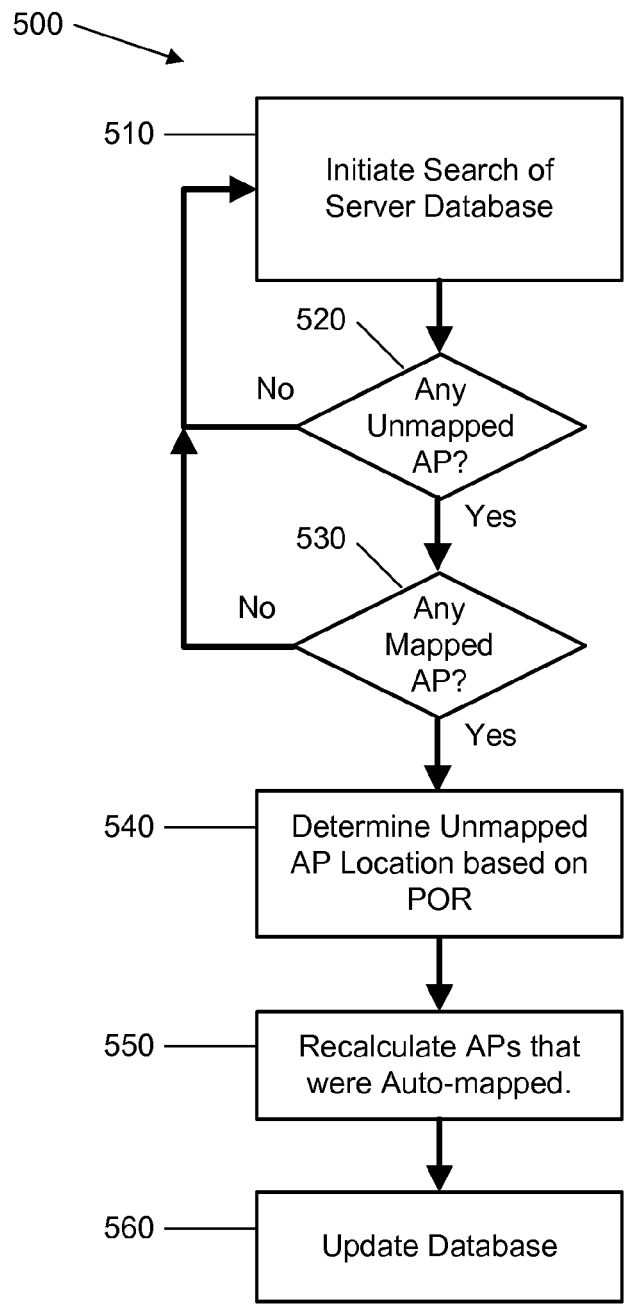
FIG. 5 is a flow chart of the process for mapping access point locations based on known points of reference according to an embodiment of the invention.

FIG. 5 shows a method 500 according to one embodiment of the present invention for determining the location of an AP. In this embodiment the server, a process running on the server or remote system access the server database and process the data stored in the server database. At 510, the process is executed and initiates a search of the database for groups of AP connection data that was received at the same time from the same client. At 520, the process can search each group of AP connection data to determine if any of the APs reported are not mapped. This can be accomplished by evaluating the Mapping Type value associated with any AP for an indication that the AP is not mapped, for example, a value=0. If not, the process can loop back to 510 and process the next group of AP connection data or pause and be restarted when a new set of AP reports are received. At 530, the process searches the group of AP connection data to determine if location information is available for any AP in the group. If not, the process can loop back to 510 and process the next group of AP connection data or pause and be restarted when a new set of AP reports are received. At 540, APs that have location information can be used as points of reference to determine an approximate location of the APs that are unmapped. These newly mapped APs can be associated with the Mapping Type "Auto-Mapped" (Mapping Type value=5) meaning that location is an approximation based on other points of reference. At 550, where there are previously "auto-mapped" APs in the group, the process can calculate a new location of each of these APs using the new information. The new location for each "auto-mapped" AP can be an average or a weighted average of the old location information and the new location information for the AP. These APs can continue to be associated with the Mapping Type "Auto-Mapped" (Mapping Type value=5) because that new location is still an approximation based on other points of reference. At 560, the server database can be updated with the new or updated "Auto-Mapped" locations.

Each point of reference (POR) can be calculated as function of the longitude and latitude values of some or all mapped APs and the signal strength measured for each AP. In accordance with one embodiment of the invention, the POR can be calculated in assigning weighting levels to two or more RSSI levels and calculating the POR as a function of the weighting levels and weighted average of the longitude and latitude values of some or all mapped APs.

In accordance with one embodiment of the invention, three or more weight levels corresponding to three or more RSSI levels are defined and the POR weighted average for the longitude and latitude values can be calculated according to the equations below:

$$POR_{long} = \frac{\sum_{i=1}^{n} Wi * AP_{Long}i}{\sum_{i=1}^{n} Wi}$$

$$POR_{lat} = \frac{\sum_{i=1}^{n} Wi * AP_{lat}i}{\sum_{i=1}^{n} Wi}$$

Where: $W_i$ is a number proportional or inversely proportional to the signal strength of the signal coming for $AP_i$, $AP_{long\ i}$ is the longitude of $AP_i$, $AP_{lat\ I}$ is the latitude of $AP_i$.

The AP location can be determined to be a random value around the calculated POR, for example using MaxRand ($POR_{long}$, $POR_{lat}$).

The client can be implemented using a software program stored in the memory of the wireless user terminal. The client software can stored on optical computer readable media (such as a compact disc (CD), a digital versatile disk (DVD) or any other optical memory device) on magnet computer readable media (such as a floppy disk, a hard disk, or magnetic tape), on solid state computer readable media (such as Read Only Memory (ROM), Programmable Read Only Memory (PROM, EPROM and EEPROM), Random Access Memory (RAM), battery backed-up RAM, flash memory and solid state disk). The software program can include computer instructions that cause a computer to perform the methods according to one or more embodiments of the present invention and cause the a general purpose computer to become a specific purpose machine according to one or more of the embodiments of the present invention.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described methods and systems may be implemented in a wide variety of programming or scripting languages, such as Assembler, C|C*, Perl, shell, PHP, Java, etc.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. Various aspects and/or components of the described embodiments may be used singly or in any combination in the plasma chamber arts. It is intended that the specification and examples be considered as exemplary only, with a true scope and spirit of the invention being indicated by the following claims.

The invention claimed is:

1. A system for mapping locations of wireless access points, the wireless access points providing access to a network, the system comprising:

a server connected to the network and adapted to receive one or more sets of access point connection data from a first wireless user terminal connected to the network, said first set of access point connection data including information about one or more wireless access points within range of the first wireless user terminal;

a data storage device connected to the server and adapted to store information about a first access point wherein the information stored includes an access point identifier and location information for the first access point, and wherein, the server receives wireless access point connection data that includes information about the first wireless access point and a second wireless access point from the same wireless user terminal at substantially the same time and the server is adapted to store information about the second access point, the information about the second access point including an access point identifier for the second access point and location information determined as a function the location information for the first access point;

wherein the data storage device stores information about a second wireless access point and the information stored includes an access point identifier and location information for the second wireless access point, and the wireless access point connection data received by the server includes a first indication of signal strength of the signal received from the first wireless access point by the wireless user terminal, a second indication of signal strength of the signal received from the second wireless access point by the wireless user terminal and a third indication of signal strength of the signal received from a third wireless access point by the wireless user terminal; and wherein location information for the third wireless access point is determined as a function of the first indication of signal strength, the second indication of signal strength and the third indication of signal strength and the location information for at least one of the first wireless access point and the second wireless access point.

2. A system according to claim 1 wherein the location information for the third wireless access point is determined as a function of the first indication of signal strength, the second indication of signal strength and the third indication of signal strength and the location information for at least one of the first wireless access point and the second wireless access point.

3. A system according to claim 1 wherein the location information for the third wireless access point is determined as a function of a weighted average of the first indication of signal strength, the second indication of signal strength and the third indication of signal strength and the location information for at least one of the first wireless access point and the second wireless access point.

4. A method of mapping locations of wireless access points, the wireless access points providing access to a network, the method comprising:

detecting one or more wireless access points;

determining a first set of access point connectivity information about a first detected wireless access point by establishing a connection to the network through the first detected wireless access point;

storing in a data store, access point connectivity information about the first detected wireless access point, wherein the information stored in the data store includes an access point identifier and location information for the first detected wireless access point;

determining a second set of access point connectivity information about a second detected wireless access point by establishing a connection to the network through the second detected wireless access point, said second set of access point connection data including an access point identifier but no location information for the access point, and storing in the data store, access point connectivity information about the second detected wireless access point, wherein the information stored in the data store includes an access point identifier for the second detected wireless access point and location information derived from the location information determined for the first detected wireless access point.

5. The method according to claim 4 further including sending the access point connectivity information about the first detected wireless access point and the access point connectivity information about the second detected wireless access point over a network to a server.

6. The method according to claim 4 further including determining a third set of access point connectivity information about a third detected wireless access point, said third set of wireless access point connection data including an access point identifier and location information for the third detected wireless access point, and storing in the data store, access point connectivity information about the second detected wireless access point, wherein the information stored in the data store includes an access point identifier for the second detected wireless access point and location information determined as a function of the location information determined for the first detected wireless access point and location information for the third detected wireless access point.

7. The method according to claim 4 wherein the access point connectivity information about the first detected wireless access point includes information about the received signal strength of the signal received from the first detected wireless access point;

the access point connectivity information about the second detected wireless access point includes information about the received signal strength of the signal received from the second detected wireless access point;

the access point connectivity information about the third detected wireless access point includes information about the received signal strength of the signal received from the third detected wireless access point; and wherein the location information for the second detected access point is determined as a function of the location information determined for the first detected wireless access point, location information for the third detected wireless access point, the information about the received signal strength of the signal received from the first detected wireless access point, the information about the received signal strength of the signal received from the second detected wireless access point and the information about the received signal strength of the signal received from the third detected wireless access point.

8. A computer readable medium including computer readable instructions that, when executed by a computer, are configured to cause the computer to perform the following:

detecting one or more wireless access points;

determining a first set of access point connectivity information about a first detected wireless access point by establishing a connection to a network through the first detected wireless access point;

storing in a data store, access point connectivity information about the first detected wireless access point, wherein the information stored in the data store includes an access point identifier and location information for the first detected wireless access point;

determining a second set of access point connectivity information about a second detected wireless access point by establishing a connection to the network through the second detected wireless access point, said second set of access point connection data including an access point identifier but no location information for the access point, and storing in the data store, access point connectivity information about the second detected wireless access point, wherein the information stored in the data store includes an access point identifier for the second detected wireless access point and location information derived from the location information determined for the first detected wireless access point.

9. A computer readable medium according to claim 8 further including computer readable instructions that, when executed by a computer, are configured to cause the computer to send the access point connectivity information about the first detected wireless access point and the access point connectivity information about the second detected wireless access point over a network to a server.

10. A computer readable medium according to claim 8 further including computer readable instructions that, when executed by a computer, are configured to cause the computer to determine a third set of access point connectivity information about a third detected wireless access point, said third set of wireless access point connection data including an access point identifier and location information for the third detected wireless access point, and store in the data store, access point connectivity information about the second detected wireless access point, wherein the information stored in the data store includes an access point identifier for the second detected wireless access point and location information determined as a function of the location information determined for the first detected wireless access point and location information for the third detected wireless access point.

11. A computer readable medium according to claim 8 wherein the access point connectivity information about the first detected wireless access point includes information about the received signal strength of the signal received from the first detected wireless access point;

the access point connectivity information about the second detected wireless access point includes information about the received signal strength of the signal received from the second detected wireless access point;

the access point connectivity information about the third detected wireless access point includes information about the received signal strength of the signal received from the third detected wireless access point; and wherein the location information for the second detected access point is determined as a function of the location information determined for the first detected wireless access point, location information for the third detected wireless access point, the information about the received signal strength of the signal received from the first detected wireless access point, the information about the received signal strength of the signal received from the second detected wireless access point and the information about the received signal strength of the signal received from the third detected wireless access point.

* * * * *